(12) United States Patent
Lee et al.

(10) Patent No.: US 10,988,604 B2
(45) Date of Patent: Apr. 27, 2021

(54) METHOD OF PREPARING DIENE-BASED RUBBER LATEX, METHOD OF PREPARING ABS-BASED GRAFT COPOLYMER AND METHOD OF MANUFACTURING INJECTION-MOLDED ARTICLE

(71) Applicant: LG CHEM, LTD., Seoul (KR)

(72) Inventors: Jin Hyoung Lee, Daejeon (KR); Young Min Kim, Daejeon (KR); Su Jeong Han, Daejeon (KR); Yoo Vin Kim, Daejeon (KR); Young Hwan Jeong, Daejeon (KR); Sun Haeng Chung, Daejeon (KR); Jae Min Suk, Daejeon (KR); Jae Won Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 374 days.

(21) Appl. No.: 15/780,222

(22) PCT Filed: Aug. 1, 2017

(86) PCT No.: PCT/KR2017/008283
§ 371 (c)(1),
(2) Date: May 30, 2018

(87) PCT Pub. No.: WO2018/084407
PCT Pub. Date: May 11, 2018

(65) Prior Publication Data
US 2018/0362750 A1 Dec. 20, 2018

(30) Foreign Application Priority Data

Nov. 1, 2016 (KR) .................. 10-2016-0144441
Jul. 13, 2017 (KR) .................. 10-2017-0088827

(51) Int. Cl.
| | | |
|---|---|---|
| C08L 25/12 | (2006.01) | |
| C08F 279/04 | (2006.01) | |
| C08F 36/04 | (2006.01) | |
| B29C 45/00 | (2006.01) | |
| C08F 36/06 | (2006.01) | |
| B29K 55/02 | (2006.01) | |
| C08F 2/24 | (2006.01) | |
| C08F 2/38 | (2006.01) | |
| C08K 5/372 | (2006.01) | |
| C08L 55/02 | (2006.01) | |
| C08K 5/36 | (2006.01) | |
| C08K 5/092 | (2006.01) | |

(52) U.S. Cl.
CPC .......... *C08L 25/12* (2013.01); *B29C 45/0001* (2013.01); *C08F 2/24* (2013.01); *C08F 2/38* (2013.01); *C08F 36/04* (2013.01); *C08F 36/06* (2013.01); *C08F 279/04* (2013.01); *C08K 5/092* (2013.01); *C08K 5/36* (2013.01); *C08K 5/372* (2013.01); *C08L 55/02* (2013.01); *B29K 2055/02* (2013.01); *B29K 2995/003* (2013.01); *B29K 2995/0022* (2013.01); *B29K 2995/0089* (2013.01); *C08F 2800/20* (2013.01); *C08F 2810/20* (2013.01)

(58) Field of Classification Search
CPC .... C08L 25/12; C08L 2/24; C08L 2/38; C08L 55/02; C08K 5/372; C08K 5/36; C08K 5/092; C08F 36/04; C08F 36/06; C08F 279/04; C08F 2800/20; C08F 2810/20; B29C 45/0001; B29K 2995/0022; B29K 2995/003; B29K 2995/0089; B29K 2055/02

See application file for complete search history.

(56) References Cited

U.S. PATENT DOCUMENTS

| | | | |
|---|---|---|---|
| 2,876,203 A | 3/1959 | Miller et al. | |
| 4,385,157 A * | 5/1983 | Auclair | C08F 279/04 525/316 |
| 6,939,915 B2 | 9/2005 | Vanhoorne et al. | |
| 9,790,308 B2 | 10/2017 | Han et al. | |
| 10,501,570 B2 * | 12/2019 | Lee | C08F 2/38 |
| 10,508,159 B2 * | 12/2019 | Lee | C08F 2/24 |
| 2012/0034478 A1 | 2/2012 | Pepers et al. | |

(Continued)

FOREIGN PATENT DOCUMENTS

| | | |
|---|---|---|
| CN | 1416433 A | 5/2003 |
| CN | 103930482 A | 7/2014 |
| CN | 104987775 A | 10/2015 |

(Continued)

OTHER PUBLICATIONS

English-language translation of the Written Opinion of the International Searching Authority for PCT/KR2017/008283, dated Dec. 18, 2017, 14 pages. (Year: 2017).*
European Search Report for European Application No. 17867447, dated Dec. 21, 2018.
Office Action dated Nov. 4, 2019 for Chinese Application 201780004325.9.
International Search Report for International Patent Application No. PCT/KR2017/008283, dated Dec. 18, 2017.

*Primary Examiner* — William P Fletcher, III

(57) ABSTRACT

A method of preparing a diene-based rubber latex, a method of preparing an ABS-based graft copolymer including the same, and a method of manufacturing an ABS-based injection-molded article include preparing an in-situ bimodal rubber latex, in which a small-diameter polymer and a large-diameter polymer are formed in a desired ratio, by controlling contents, addition time points, and types of reactants when a conjugated diene based monomer, a cross-linking agent with a long linear chain end, an emulsifier including a multimeric acid of an unsaturated fatty acid or a metal salt thereof, and a molecular weight regulator are polymerized.

18 Claims, No Drawings

(56) References Cited

U.S. PATENT DOCUMENTS

2016/0105171 A1    4/2016  Kim

FOREIGN PATENT DOCUMENTS

| EP | 2404941 A1 | | 1/2012 |
|----|------------|---|--------|
| EP | 3363833 A1 | | 8/2018 |
| KR | 100755592 B1 | | 9/2007 |
| KR | 10-0806123 B1 | | 2/2008 |
| KR | 101288752 B1 | * | 7/2013 |
| KR | 10-2014-0045883 A | | 4/2014 |
| KR | 10-2014-0046755 A | | 4/2014 |
| KR | 10-2016-0078288 A | | 7/2016 |
| KR | 1020160078288 A | * | 7/2016 |
| WO | WO2016105171 A1 | | 6/2016 |

\* cited by examiner

METHOD OF PREPARING DIENE-BASED RUBBER LATEX, METHOD OF PREPARING ABS-BASED GRAFT COPOLYMER AND METHOD OF MANUFACTURING INJECTION-MOLDED ARTICLE

This application is a U.S. National Stage of PCT/KR2017/008283 filed Aug. 1, 2017, which claims the priority benefit of Korean Patent Application No. 10-2016-0144441, filed on Nov. 1, 2016, and Korean Patent Application No. 10-2017-0088827, filed on Jul. 13, 2017, in the Korean Intellectual Property Office, the disclosures of which are incorporated herein by reference.

CROSS-REFERENCE TO RELATED APPLICATIONS

This application claims the priority benefit of Korean Patent Application No. 10-2016-0144441, filed on Nov. 1, 2016, and Korean Patent Application No. 10-2017-0088827, filed on Jul. 13, 2017, in the Korean Intellectual Property Office, the disclosures of which are incorporated herein by reference.

TECHNICAL FIELD

The present invention relates to a method of preparing a diene-based rubber latex, a method of preparing an ABS-based graft copolymer including the same, and a method of manufacturing an ABS-based injection-molded article. More particularly, the present invention relates to a method of producing an ABS-based graft copolymer and ABS-based injection-molded article having improved mechanical properties and surface characteristics from a bimodal rubber latex prepared by split-adding an emulsifier including a multimeric acid of an unsaturated fatty acid or a metal salt thereof, a crosslinking agent with a long linear chain end, and a molecular weight regulator depending upon a polymerization conversion rate.

BACKGROUND ART

Thermoplastic resins have relatively satisfactory impact resistance, mechanical strength, moldability, gloss, and the like. Accordingly, thermoplastic resins have been widely applied to electric components, electronic components, office equipment, automobile components, and the like.

An acrylonitrile-butadiene-styrene (ABS) resin, as a representative thermoplastic resin, includes a rubber polymer having superior rubbery properties as a main ingredient.

The rubber polymer is generally prepared by emulsion-polymerizing a conjugated diene based monomer, and an ABS-based graft copolymer may be prepared by mixing the rubber polymer with an aromatic vinyl monomer and a vinyl cyan monomer and grafting the monomers by an emulsion polymerization method. An ABS-based copolymer resin prepared by such an emulsion polymerization method has superior properties and property balance, compared to that prepared by a bulk polymerization method. Accordingly, an ABS-based copolymer resin has been mainly prepared by an emulsion polymerization method.

Further, an ABS-based graft copolymer prepared as described above may be mixed with a styrene-acrylonitrile copolymer (SAN), and then may be applied to various products through thermomolding.

Meanwhile, when a rubber polymer is prepared by emulsion polymerization, the particle diameter of the polymer is closely related to polymerization time, and the polymer particle diameter considerably affects mechanical properties and surface characteristics of a finally produced ABS-based resin. In particular, the impact resistance of a resin is greatly affected by a particle diameter and particle size distribution of a dispersed rubber polymer, and the like, and, to sufficiently secure impact resistance of a resin, a rubber polymer having a large particle diameter should be obtained.

To obtain a rubber polymer having a large particle diameter by emulsion polymerization, a long time is generally consumed. Accordingly, to obtain a rubber polymer having a large particle diameter in a relatively short time, a method of adding small amounts of emulsifier, vinyl cyan monomer, and the like before polymerization initiation, a method of continuously adding the emulsifier, and the like have been proposed. However, these methods still have a problem that a reaction time of 30 hours or more is consumed.

In addition, when emulsion polymerization is performed at a high temperature so as to shorten reaction time, the proportion of a polymer having a small particle diameter increases, the content of coagulum increases, and reaction heat and reaction pressure rapidly increase, whereby stability is decreased.

Further, when a thermoplastic ABS-based resin is prepared using a graft copolymer including a rubber polymer having a large particle diameter prepared according to a conventional method, low-temperature impact strength is greatly decreased. In addition, an emulsifier, unreacted monomers, oligomers, and the like remaining after ABS graft polymerization are vaporized from a resin surface during high-temperature thermomolding which makes surface roughness poor. Accordingly, there is a limitation in increasing surface characteristics of a resin.

Accordingly, there is still a need for an ABS-based resin production technology capable of providing superior mechanical strength and surface characteristics while increasing the productivity of rubber latex.

RELATED ART DOCUMENT

[Patent Document] KR 10-0806123 B1

DISCLOSURE

Technical Problem

Therefore, the present invention has been made in view of the above problems, and it is one object of the present invention to provide a method of preparing a diene-based rubber latex, the method being characterized by using a novel emulsifier, which is not easily vaporized, in a high-temperature thermomolding process when the diene-based rubber latex is polymerized using a conjugated diene based monomer, a crosslinking agent, an emulsifier, and a molecular weight regulator and controlling contents, addition time points, and types of the reactants to polymerize such that a large-diameter rubber polymer and a small-diameter rubber polymer are formed in a desired ratio at a specific time point during preparation of the large-diameter rubber polymer, and thus, is capable of providing improved mechanical properties and surface characteristics when the diene-based rubber latex is used to produce an ABS-based graft copolymer and an injection-molded article.

In accordance with another aspect of the present invention, there is provided a method of preparing an ABS-based graft copolymer capable of providing further improved mechanical properties and surface characteristics by mixing a rubber latex prepared by the method of preparing a diene-based rubber latex with an aromatic vinyl monomer and a vinyl cyan monomer and graft-polymerizing the same using the novel emulsifier.

In accordance with yet another aspect of the present invention, there is provided a method of manufacturing an ABS-based injection-molded article, the method including a step of injection-molding a resin composition including an ABS-based graft copolymer according to the method, an aromatic vinyl monomer, and a vinyl cyan monomer, and thus, being capable of providing a reduced gas generation amount (Total Volatile Organic Compounds, TVOC) during injection molding and improved gloss and clearness.

The above and other objects can be accomplished by the present disclosure described below.

Technical Solution

In accordance with one aspect of the present invention, provided is a method of preparing a diene-based rubber latex, the method including a polymerization step of polymerizing a conjugated diene based monomer, a crosslinking agent, an emulsifier, and a molecular weight regulator, wherein the crosslinking agent is represented by Formula 1 below and added in an amount of 0.05 to 0.5 parts by weight before initiation of the polymerization or when a polymerization conversion rate is 30% or less:

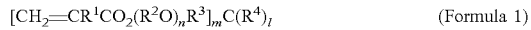

$[CH_2=CR^1CO_2(R^2O)_nR^3]_mC(R^4)_l$ (Formula 1)

wherein R 1 is hydrogen or a C1 to C10 alkyl group, R2 is a C1 to C10 alkylene group, R3 is a C1 to C10 alkylene group, R4 is a C1 to C10 alkyl group, l is an integer of 0 to 2, n is an integer of 4 to 20, m is an integer of 2 to 4, and m+l=4, and the emulsifier includes a multimeric acid of an unsaturated fatty acid or a metal salt thereof, and is added when a polymerization conversion rate is 30% or less or 50 to 85%.

In accordance with another aspect of the present invention, provided is a method of preparing an ABS-based graft copolymer, the method including a step of adding 0.05 to 3 parts by weight of an emulsifier and 0.01 to 1 part by weight of an initiator to 100 parts by weight of a monomer mixture including 40 to 70% by weight (based on solids) of the diene-based rubber latex according to the method, 20 to 50% by weight of an aromatic vinyl monomer, and 10 to 40% by weight of a vinyl cyan monomer and performing graft polymerization.

In accordance with yet another aspect of the present invention, provided is a method of manufacturing an ABS-based injection-molded article, the method including an injection-molding step of injection-molding a resin composition including 5 to 70% by weight of the ABS-based graft copolymer prepared according to the method and 30 to 95% by weight of an aromatic vinyl monomer-vinyl cyan monomer copolymer.

Advantageous Effects

As apparent from the fore-going, the present invention advantageously provides an ABS-based resin having improved mechanical properties, such as impact resistance, and improved surface characteristics, such as surface gloss and clearness, by including an in-situ bimodal rubber latex, in which a large-diameter rubber polymer and a small-diameter rubber polymer are formed in a desired ratio, prepared by using an emulsifier including a multimeric acid of an unsaturated fatty acid having a high molecular weight or a metal salt thereof when a conjugated diene based monomer, a crosslinking agent, an emulsifier, and a molecular weight regulator are polymerized, and controlling contents, addition time points, and types of the conjugated diene based monomer, the crosslinking agent, the emulsifier, and the molecular weight regulator, upon production of an ABS-based graft copolymer and an ABS-based injection-molded article.

In addition, in accordance with the present invention, since a large-diameter rubber polymer and a small-diameter rubber polymer may be formed in a desired ratio without a troublesome process of separately preparing the large-diameter rubber polymer and the small-diameter polymer and mixing the same, productivity of a latex may be improved and, by using the latex to prepare an ABS-based resin, both mechanical properties and surface characteristics may be improved.

Further, in accordance with the present invention, when the emulsifier including a multimeric acid of an unsaturated fatty acid or a metal salt thereof is used in a step of preparing an ABS-based graft copolymer, an amount of gases (TVOC) generated on a resin surface during a thermomolding process may be further reduced, thereby providing an ABS-based molded article having improved surface characteristics such as surface gloss and clearness.

BEST MODE

The present inventors confirmed that, by using a diene-based rubber latex, in which a large-diameter rubber polymer and a small-diameter rubber polymer are formed in a desired ratio, prepared by using a multimeric acid of an unsaturated fatty acid, which is not easily vaporized in a high-temperature thermomolding process, or a metal salt thereof, as an emulsifier, when a conjugated diene based monomer, a crosslinking agent, an emulsifier, and a molecular weight regulator are polymerized, and controlling contents, addition time points, and types of the reactants, upon production of an ABS-based graft copolymer and an ABS-based injection-molded article, further improved mechanical properties and surface characteristics may be provided. Based on this finding, research has been intensively conducted, thus completing present invention.

A method of preparing a diene-based rubber latex of the present invention includes a polymerization step of polymerizing a conjugated diene based monomer, a crosslinking agent, an emulsifier, and a molecular weight regulator. The crosslinking agent is a compound represented by Formula 1 below and is added in an amount of 0.05 to 0.5 parts by weight before polymerization initiation or when a polymerization conversion rate is 30% or less, and the emulsifier includes a multimeric acid of an unsaturated fatty acid or a metal salt thereof and is added when a polymerization conversion rate is 30% or less or 50 to 85%.

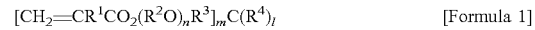

$[CH_2=CR^1CO_2(R^2O)_nR^3]_mC(R^4)_l$ [Formula 1]

wherein R 1 is hydrogen or a C1 to C10 alkyl group, R2 is a C1 to C10 alkylene group, R3 is a C1 to C10 alkylene group, R4 is a C1 to C10 alkyl group, l is an integer of 0 to 2, n is an integer of 4 to 20, m is an integer of 2 to 4, and m+l=4.

In the present invention, the conjugated diene based monomer may be split-added depending upon a polymerization conversion rate. For example, the conjugated diene based monomer may be split-added in the polymerization initiation step, when a polymerization conversion rate is 30 to 40%, and when a polymerization conversion rate is 50 to 85%. As such, a diene-based rubber polymer having a desired particle diameter may be easily formed by split-adding the conjugated diene based monomer depending upon a polymerization conversion rate.

The conjugated diene based monomer may be, for example, one or more selected from the group consisting of 1,3-butadiene, 2,3-dimethyl-1,3-butadiene, 2-ethyl-1,3-butadiene, 1,3-pentadiene, isoprene, chloroprene, piperylene, and the like.

In another embodiment of the present invention, selectively, the conjugated diene based monomer may further include a vinyl cyan monomer, an aromatic vinyl monomer, or a combination thereof.

The vinyl cyan monomer may be, for example, one or more selected from the group consisting of acrylonitrile, methyl acrylonitrile, ethyl acrylonitrile, isopropyl acrylonitrile, and the like.

The aromatic vinyl monomer may be, for example, one or more selected from the group consisting of styrene, α-methyl styrene, m-methyl styrene, p-methyl styrene, p-tert-butyl styrene, and the like.

When the conjugated diene-based monomer includes the aromatic vinyl monomer, the vinyl cyan monomer, or a combination thereof, the conjugated diene monomer may be included, for example, in an amount of 55 to 99.8% by weight, 55 to 95% by weight, or 60 to 90% by weight, the aromatic vinyl monomer may be included, for example, in an amount of 0.1 to 40% by weight, 1.5 to 22.5% by weight, or 5 to 20% by weight, and the vinyl cyanide monomer may be included, for example, in an amount of 0.1 to 40% by weight, 2.5 to 22.5% by weight, or 5 to 20% by weight, based on 100% by weight of a total of used monomers. Within this range, superior polymerization stability, mechanical properties, and gloss properties are provided.

In the present invention, the emulsifier may include a multimeric acid of an unsaturated fatty acid or a metal salt thereof. Since the multimeric acid of the unsaturated fatty acid or the metal salt thereof has a high molecular weight, a resin surface is not easily vaporized during a high-temperature thermomolding process. Accordingly, roughness of a resin surface is improved, whereby surface characteristics such as gloss or clearness may be improved.

In the present disclosure, the multimeric acid of the unsaturated fatty acid refers to a polyvalent carboxylic acid obtained by polymerizing two or more unsaturated fatty acids, and the unsaturated fatty acid is considered to include a straight-chain, branched-chain, cyclic, or complex cyclic unsaturated fatty acid or a derivative thereof. In the present disclosure, the expression "derivative" refers to a compound, one or more hydrogen atoms of which are substituted with an alkyl group, a halogen group, or a hydroxyl group. In the present disclosure, the expression "complex cyclic unsaturated fatty acid" refers to a compound including at least two saturated or unsaturated cycloalkyl groups having 5 to 15 carbon atoms.

In the present invention, the multimeric acid of the unsaturated fatty acid or the metal salt thereof may be preferably included in an amount of 30 to 100% by weight, 40 to 100% by weight, or 50 to 100% by weight based on 100% by weight of the emulsifier. Within this range, an amount of gases (TVOC) generated due to the emulsifier remaining after latex preparation is reduced, whereby surface characteristics of a final ABS-based resin may be improved.

In the present invention, the emulsifier may be added, for example, when a polymerization conversion rate is 30% or less or 50 to 85%. More preferably, the emulsifier is split-added respectively when a polymerization conversion rate is 30% or less and 50 to 85%. When the emulsifier is added at the addition time points, a rubber polymer having a desired particle diameter may be formed, a large-diameter polymer and a small-diameter polymer may be formed in a desired ratio, and productivity of an ABS-based resin may be further improved due to reduction of a coagulum content in the rubber latex.

In an embodiment, the emulsifier may include a multimeric acid of a C8 to C22 straight-chain, branched-chain, or cyclic unsaturated fatty acid or a metal salt thereof, whereby an amount of gases (TVOC) generated due to the emulsifier remaining in a high-temperature thermomolding process is reduced and thus surface characteristics of an ABS-based resin may be improved.

In another embodiment, the emulsifier may include a dimer acid of an unsaturated fatty acid or a metal salt thereof, whereby an amount of gases (TVOC) generated on a resin surface in a high-temperature thermomolding process is reduced and thus surface characteristics of a resin may be improved.

In another embodiment, the emulsifier may include a dimer acid of one or more selected from the group consisting of compounds represented by Formulas 2 to 7 below, or a metal salt, whereby an amount of gases (TVOC) generated on a resin surface in a high-temperature thermomolding process is reduced and thus surface characteristics of a resin may be improved:

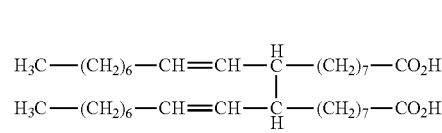

[Formula 2]

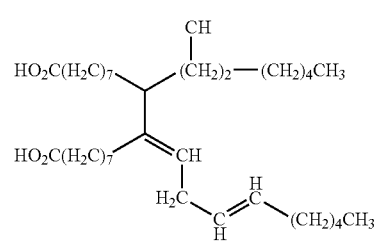

[Formula 3]

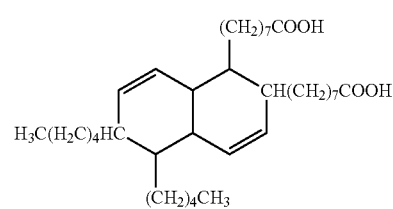

[Formula 4]

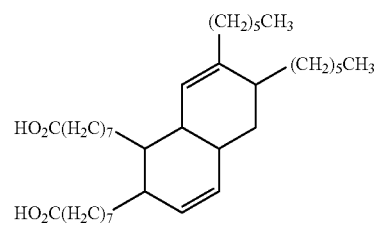

[Formula 5]

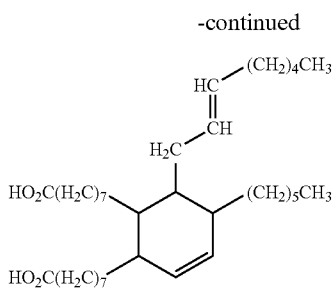

[Formula 6]

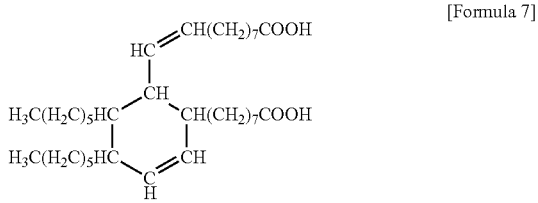

[Formula 7]

In a particular embodiment, the emulsifier may include a dimer acid derived from a compound selected from the group including 3-octenoic acid, 10-undecenoic acid, oleic acid, linoleic acid, elaidic acid, palmitoleic acid, linolenic acid, tall oil fatty acid as a mixture of unsaturated carboxylic acid, soybean oil fatty acid, palm oil fatty acid, tallow fatty acid, lard fatty acid, tallow fatty acid, rice bran oil fatty acid, and flaxseed oil fatty acid, or a metal salt thereof. However, these substances are provided merely as examples, and it should be noted that the present invention is not limited thereto.

In the present invention, the emulsifier may include an alkali metal salt or alkali earth metal salt of a multimeric acid of an unsaturated fatty acid. The alkali metal salt may be, for example, a sodium salt or a potassium salt and the alkali earth metal salt may be, for example, a magnesium salt or a calcium salt, but it should be noted that the present invention is not limited thereto.

As a particular example, the emulsifier may be an alkali metal salt (saponified substance) of a multimeric acid of an unsaturated fatty acid prepared by adding a hydroxide of an alkali metal, such as NaOH or KOH, to the multimeric unsaturated fatty acid to substitute a hydrogen of a carboxylic acid with an alkali metal.

As another particular example, the emulsifier may be a compound prepared by adding a metal salt, such as a calcium salt or a magnesium salt, to the multimeric unsaturated fatty acid or the alkali metal salt thereof, but it should be noted that the present invention is not limited thereto.

In addition, it should be noted that the emulsifier may be a mixture of two or more of the aforementioned multimeric unsaturated fatty acid and the metal salts thereof in the present invention.

In the present invention, the crosslinking agent may be added before polymerization initiation or when a polymerization conversion rate is 30% or less, 20% or less, or 15% or less. For example, when, in Formula 1, R1 is hydrogen or a C1 to C3 alkyl group, R2 is a C1 to C4 alkylene group, R3 is a C1 to C3 alkylene group, R4 is a C1 to C3 alkyl group, l is an integer of 0 to 2, n is an integer of 4 to 15, m is an integer of 2 to 4, m+1=4, and a value obtained by multiplying m by n is 8 to 60, improved surface characteristics and mechanical properties may be provided.

In another embodiment, when, in Formula 1, R1 is H or CH3, R2 is C2H4 or C3H6, R3 is CH2, R4 is C2H5, l is an integer of 0 to 2, n is an integer of 4 to 10, m is an integer of 3 or 4, m+1=4, and a value obtained by multiplying m by n is 12 to 40, superior surface characteristics and mechanical properties may be provided.

The crosslinking agent is preferably added, for example, in an amount of 0.05 to 0.5 parts by weight, 0.05 to 0.35 parts by weight or 0.1 to 0.25 parts by weight based on 100 parts by weight of a total of the monomers used in the polymerization before polymerization initiation or when a polymerization conversion rate is 30% or less. Within this range, a resultant resin exhibits superior surface gloss, clearness and mechanical properties. In particular, within this range, stability of a latex may be secured and thus impact strength of a resultant resin may be improved.

The molecular weight regulator of the present invention may be, for example, one or more selected from the group consisting of n-octyl mercaptan, sec-octyl mercaptan, n-nonyl mercaptan, n-decyl mercaptan, n-dodecyl mercaptan, t-dodecyl mercaptan, and n-octadecyl mercaptan that facilitate formation of a rubber polymer having a desired particle diameter without decrease in reaction speed.

The molecular weight regulator is preferably added in an amount of 0.01 to 0.25 parts by weight, 0.05 to 0.25 parts by weight, or 0.1 to 0.2 parts by weight when a polymerization conversion rate is 40 to 75%, 45 to 65%, or 50 to 60%. Within this range, a rubber polymer having a desired particle diameter may be easily prepared without decreased in reaction speed.

In addition, the molecular weight regulator may be selectively added in an amount of 0.1 to 1 part by weight or 0.1 to 0.5 parts by weight before polymerization initiation. The molecular weight regulator added before polymerization initiation may be, for example, one or more selected from the group consisting of n-decyl mercaptan, n-dodecyl mercaptan, t-dodecyl mercaptan, and n-octadecyl mercaptan.

For reference, when the molecular weight regulator added before polymerization initiation and the molecular weight regulator added when a polymerization conversion rate is 40 to 75% have the same chain length, it is preferred to add a substance in a preceding order among tert, iso, and normal substances before polymerization initiation and add the remaining substances when a polymerization conversion rate is 40% to 75% in terms of reaction speed and polymerization stability.

In addition, when the molecular weight regulator added before polymerization initiation and the molecular weight regulator added when a polymerization conversion rate is 40 to 75% have different same chain lengths, it is preferred to add a substance having a low radical consumption rate before polymerization initiation and add a substance having a high radical consumption rate when a polymerization conversion rate is 40% to 75% in terms of reaction speed and polymerization stability.

As a particular example, when t-dodecyl mercaptan is added before polymerization initiation, a molecular weight regulator added when a polymerization conversion rate is 40% to 75% is preferably t-dodecyl mercaptan, n-dodecyl mercaptan, or n-decyl mercaptan.

More particularly, the method of preparing a diene-based rubber latex of the present invention may include one or more or all of the following steps:

A polymerization initiation step of initiating polymerization of
a) 60 to 75 parts by weight of the conjugated diene based monomer, 0.05 to 3 parts by weight of the emulsifier, and 0.01 to 1 part by weight of an initiator at 60 to 75° C.;

b) a secondary emulsifier addition step of adding 10 to 25 parts by weight of the conjugated diene based monomer and 0.1 to 1.0 part by weight of a secondary emulsifier when a polymerization conversion rate is 30 to 40%;

c) an additional emulsifier addition step of adding 5 to 20 parts by weight of the conjugated diene based monomer and 0.01 to 0.5 parts by weight of the emulsifier when a polymerization conversion rate is 50 to 85%; and d) a latex obtainment step of terminating polymerization when a polymerization conversion rate is 90 to 99% and obtaining a diene-based rubber latex.

In the polymerization initiation step, the conjugated diene based monomer is preferably added, for example, in an amount of 60 to 75 parts by weight, 62 to 72 parts by weight, or 65 to 70 parts by weight. Within this range, excessive increase in reaction pressure and reaction temperature does not occur, whereby stability of the reactants is improved and thus a rubber polymer having a desired particle diameter may be easily prepared.

In the polymerization initiation step, the emulsifier may be added, for example, in an amount of 0.05 to 3 parts by weight, 0.5 to 3 parts by weight, or 1 to 3 parts by weight. Within this range, polymerization stability is superior and a rubber latex having a desired particle diameter may be prepared.

In addition, as the emulsifier in the polymerization initiation step, a multimeric acid of an unsaturated fatty acid or a metal salt thereof may be used alone, or may be used as a mixture with one or more secondary emulsifiers selected from the group consisting of a sodium lauryl sulfate, a sulfonated alkyl ester, a sodium alkylbenzene sulfonate, sodium dodecyl allyl sulfosuccinate, sodium acrylamido stearate, a polyoxyethylene alkyl ether sulfate ester ammonium salt, a C16 to C18 alkenyl succinic acid di-potassium salt, a polyoxyethylene alkyl phenyl ether, a polyoxyethylene alkyl phenyl ether ammonium sulfate, a rosin acid metal salt, a fatty acid metal salt, and an oleic acid metal salt.

When the emulsifier in the polymerization initiation step includes the secondary emulsifier, a content of the secondary emulsifier is preferably less than 30% by weight or 20% by weight or less based on 100% by weight of the emulsifier. Within this range, stability of emulsion polymerization is secured, and surface characteristics and mechanical properties of a resultant resin are improved due to reduction of gases (TVOC) generated at a resin surface during a high-temperature thermomolding process.

The initiator in the polymerization initiation step is preferably included in an amount of 0.01 to 1 part by weight, 0.1 to 0.7 parts by weight, or 0.2 to 0.4 parts by weight based on 100 parts by weight of a total of the monomers used in the polymerization. Within this range, emulsion polymerization may be efficiently performed.

The initiator may be, for example, one or more selected from the group consisting of potassium persulfate, sodium persulfate, ammonium persulfate, cumene hydroperoxide, diisopropylbenzene hydroperoxide, azobisisobutyronitrile, tertiary butyl hydroperoxide, para-methane hydroperoxide, and benzoyl peroxide.

In the polymerization initiation step, at least one oxidation-reduction catalyst selected from a group including sodium formaldehyde sulfoxylate, sodium ethylene diamine tetraacetate, ferrous sulfate, dextrose, pyrrole sodium phosphate, sodium sulfite, and the like may be further, selectively included. When the oxidation-reduction catalyst is further included, efficient polymerization may be accomplished.

In the polymerization initiation step, an electrolyte may be further, selectively included in an amount of 0.01 to 3 parts by weight or 0.2 to 3 parts by weight based on 100 parts by weight of a total of the monomers used in the polymerization. Within this range, stability of a latex is improved and a polymer having a desired particle diameter may be prepared.

The electrolyte may be, for example, one or more selected from the group consisting of KCl, NaCl, KHCO3, NaHCO$_3$, K2CO3, Na2CO3, KHSO3, NaHSO3, Na2S2O7, K4P2O7, K3PO4, Na3PO4, K2HPO4, and Na2HPO4.

The polymerization initiation step may be initiated at 60 to 75° C., 65 to 75° C., or 65 to 70° C. In this case, excessive reaction does not occur and a polymerization degree of the conjugated diene based monomer may be improved.

In an embodiment, the secondary emulsifier addition step may be performed by adding 10 to 25 parts by weight of the conjugated diene based monomer and 0.1 to 1.0 part by weight of the secondary emulsifier when a polymerization conversion rate is 30 to 40%. By additionally adding the conjugated diene based monomer when a polymerization conversion rate is 30 to 40%, a polymer having a desired particle diameter may be easily formed and polymerization stability may be improved due to addition of the secondary emulsifier.

In another embodiment, the secondary emulsifier addition step may be performed by adding 15 to 20 parts by weight of the conjugated diene based monomer and 0.1 to 0.8 parts by weight of the secondary emulsifier when a polymerization conversion rate is 30 to 40%. Within this range, a polymer having a desired particle diameter may be easily formed, polymerization stability may be improved, and an amount of gases (TVOC) generated during a thermomolding process may be further reduced.

The secondary emulsifier might not be specified by a CMC value and may be, for example, one or more selected from the group consisting of sodium lauryl sulfate, a sulfonated alkyl ester, a sodium alkylbenzene sulfonate, sodium dodecyl allyl sulfosuccinate, sodium acrylamido stearate, a polyoxyethylene alkyl ether sulfate ester ammonium salt, a C16 to C18 alkenyl succinic acid di-potassium salt, a polyoxyethylene alkyl phenyl ether, a polyoxyethylene alkyl phenyl ether ammonium sulfate, a rosin acid metal salt, a fatty acid metal salt, and an oleic acid metal salt.

In the additional emulsifier addition step, for example, 5 to 20 parts by weight of the conjugated diene based monomer and 0.01 to 0.5 parts by weight of the emulsifier may be added when a polymerization conversion rate is 50 to 85%, 55 to 80%, or 60 to 70%. Within this range, polymerization speed is improved and thus productivity of a latex is improved. In addition, a large-diameter polymer and a small-diameter polymer may be formed in a desired ratio and, finally, mechanical properties and surface characteristics of an ABS-based resin are improved.

In the additional emulsifier addition step, as another example, the conjugated diene based monomer may be added in an amount of 10 to 20 parts by weight and the emulsifier may be added in an amount of 0.1 to 0.5 parts by weight when a polymerization conversion rate is 50 to 85%, 55 to 80%, or 60 to 70%. Within this range, polymerization speed is improved and thus productivity of a latex is improved. In addition, a large-diameter polymer and a small-diameter polymer may be formed in a desired ratio and, finally, mechanical properties and surface characteristics of a resin are improved.

As the emulsifier in the additional emulsifier addition step, a multimeric acid of an unsaturated fatty acid having a CMC of greater than 150 mg/L, 165 mg/L or more, 175 mg/L or more, 190 mg/L or more, or greater than 150 mg/L to 1,000 mg/L or less, or a metal salt thereof may be used alone, a secondary emulsifier having a CMC of 150 mg/L or less may be used, or a mixture of the emulsifier and a secondary emulsifier may be used. Within this range, polymerization stability is superior and a large-diameter polymer and a small-diameter polymer are formed in a desired ratio, thereby improving surface characteristics, impact resistance, and the like of an ABS-based resin.

When the emulsifier in the additional emulsifier addition step includes the secondary emulsifier having a CMC of 150 mg/L or less, the secondary emulsifier is preferably included in an amount of less than 30% by weight or 20% by weight or less based on 100% by weight of the emulsifier. Within this range, a large-diameter polymer and a small-diameter polymer are easily formed in a desired ratio, thereby providing improved impact resistance. In addition, an amount of gases (TVOC) generated on a resin surface during a high-temperature thermomolding process is reduced, thereby improving surface characteristics of a resin.

The secondary emulsifier having a CMC of 150 mg/L or less may include a secondary emulsifier having a CMC of 10 mg/L or less, a secondary emulsifier having a CMC of greater than 10 to 150 mg/L or less, or a mixture thereof, whereby a large-diameter rubber polymer and a small-diameter rubber polymer may be formed in a desired ratio.

The secondary emulsifier having a CMC of 10 mg/L or less may be, for example, one or more selected from the group consisting of a C16 to C18 alkenyl succinic acid di-potassium salt, a polyoxyethylene alkyl phenyl ether, and a polyoxyethylene alkyl phenyl ether ammonium sulfate.

The secondary emulsifier having a CMC of greater than 10 to 150 mg/L or less may be a fatty acid metal salt or an oleic acid metal salt.

In the present disclosure, the CMC is measured by means of a surface tensiometer and may be determined by measuring a surface tension of an emulsifier while varying a concentration thereof in distilled water.

The polymerization may be determined when a polymerization conversion rate is 90 to 99%, 92 to 99% or 95 to 99%, thereby obtaining a diene-based rubber latex. Within this range, a polymerization degree is high and a rubber latex having a low coagulum content may be obtained in a high yield.

The diene-based rubber latex prepared according to the present invention may be, for example, an in-situ bimodal rubber latex including a large-diameter rubber polymer having an average particle diameter of 2,600 to 5,000 Å or 3,000 to 3,500 Å and a small-diameter rubber polymer having an average particle diameter of 200 to 800 Å or 300 to 700 Å. When an ABS-based graft copolymer and an ABS-based resin composition are prepared using such a diene-based rubber latex, impact resistance and surface characteristics may be improved while providing polymerization stability.

In the present disclosure, the expression "in-situ bimodal rubber latex" refers to a rubber latex having bimodal-shaped particle distribution by single polymerization and is distinguished from one prepared by mixing two rubber polymers having a mixture of different average particle diameters.

In addition, in the diene-based rubber latex prepared according to the present invention, a weight ratio of the large-diameter rubber polymer to the small-diameter rubber polymer may be 98:2 to 99.9:0.1, or 98:2 to 99:1. Within this range, limitation on a particle diameter may be overcome and improved surface gloss, clearness, and mechanical properties may be provided.

In addition, since the present invention provides the diene-based rubber latex prepared using the emulsifier including a multimeric acid of an unsaturated fatty acid or a metal salt thereof as described above, an amount of gases (TVOC) generated during a thermomolding process is reduced, thereby providing further improved surface gloss and clearness.

Other conditions, such as reaction pressure, reaction time, and temperature, other than the aforementioned conditions, are not specifically limited so long as they are within a range of conditions generally practiced in the technical field to which the present invention pertains, and may be appropriately selected and carried out as needed.

Hereinafter, a method of preparing an ABS-based graft copolymer including the diene-based rubber latex according to the present invention is described.

The method of preparing an ABS-based graft copolymer according to the present invention may include, for example, a step of adding 0.05 to 3 parts by weight of the emulsifier and 0.01 to 1 part by weight of an initiator to 100 parts by weight of a monomer mixture including 40 to 70% by weight (based on solids) of the diene-based rubber latex, 20 to 50% by weight of an aromatic vinyl monomer, and 10 to 40% by weight of a vinyl cyan monomer and graft-polymerizing the same. Within this range, properties, such as surface gloss and clearness, impact strength, and low-temperature impact strength, of a resultant ABS-based copolymer are improved.

As another example, the method of preparing the ABS-based graft copolymer of the present invention may include a step of adding 0.5 to 2 parts by weight of an emulsifier and 0.05 to 0.5 parts by weight of an initiator to 100 parts by weight of a monomer mixture including 55 to 70% by weight (based on solids) of the diene-based rubber latex, 20 to 35% by weight of an aromatic vinyl monomer, and 10 to 25% by weight of a vinyl cyan monomer and graft-polymerizing the same. Within this range, properties, such as surface gloss and clearness, impact strength, and low-temperature impact strength, of a resultant ABS-based copolymer are improved.

As the emulsifier, the multimeric acid of the unsaturated fatty acid or the metal salt thereof, a conventional emulsifier for preparing an ABS-based graft copolymer, such as a rosin acid metal salt or a fatty acid metal salt, or a mixture thereof may be used.

In an embodiment, the emulsifier including the multimeric acid of the unsaturated fatty acid or the metal salt thereof may include 30 to 100% by weight, 40 to 100% by weight, or 50 to 100% by weight of the multimeric acid of the unsaturated fatty acid or the metal salt thereof based on 100% by weight of the emulsifier. Within this range, graft polymerization stability is improved, and further improved surface gloss and clearness may be provided due to reduction in an amount of gases (TVOC) generated on a resin surface in a high-temperature thermomolding process.

In the present invention, for example, tertiary butyl hydroperoxide, benzoyl peroxide, or the like may be used as the initiator, but it should be noted that the present invention is not limited thereto.

In the method of preparing an ABS-based graft copolymer, for example, a molecular weight regulator or an oxidation-reduction catalyst may be further included. The molecular weight regulator and the oxidation-reduction catalyst are not specifically limited so long as they have generally been used to prepare an ABS-based graft copolymer, and may be selectively used as needed.

In addition, an ABS-based graft copolymer prepared according to the method is prepared into a latex, and may be provided as a powder through general processes such as coagulation, aging, dehydration, and drying. Processes such as coagulation, aging, dehydration, and drying are not specifically limited so long as they have been generally performed in the art.

Other reaction conditions, such as reaction time, reaction temperature, pressure, and an addition time point of a reactant, other than the aforementioned conditions are not specifically limited so long as they are within a range of conditions generally used in the technical field to which the present invention pertains, and may be appropriately selected and carried out as needed.

Further, a powder of the ABS-based graft copolymer prepared according to the method may be prepared into an ABS-based injection-molded article by mixing with a SAN resin and the like and extruding and injection-molding the same.

In an embodiment, a method of manufacturing an ABS-based injection-molded article according to the present invention may include a step of injection-molding a resin composition including 5 to 70% by weight of the ABS-based graft copolymer and 30 to 95% by weight of an aromatic vinyl monomer-vinyl cyan monomer copolymer. Within this range, superior mechanical properties and surface characteristics are provided.

In another embodiment, the method of manufacturing an ABS-based injection-molded article according to the present invention may include a step of injection-molding a resin composition including 20 to 40% by weight of the ABS-based graft copolymer and 60 to 80% by weight of an aromatic vinyl monomer-vinyl cyan monomer copolymer. Within this range, superior mechanical properties and surface characteristics are provided.

The extrusion may be carried out, for example, at 200 to 240° C. and 140 to 190 rpm, or 200 to 220° C. and 150 to 180 rpm. Within this range, an ABS-based resin having desired properties may be prepared.

During the injection-molding, a gas (TVOC) generation amount is preferably 4,000 ppm or less, 3,500 ppm or less, 2,500 ppm or less, 2,000 ppm or less, or 100 to 4,000 ppm or less. Within this range, surface gloss and clearness of an injection-molded article are improved.

In the present disclosure, the gas (TVOC) generation amount during the injection-molding is measured by analyzing a total amount of volatile organic compounds (VOC) generated, at 250° C. for 1 hour, from 1 g of a pellet produced by extruding the ABS-based graft copolymer using HS-GC/MSD.

The injection-molding may be carried out, for example, under a condition of 200 to 230° C. and 70 to 90 bar, or 200 to 220° C. and 70 to 80 bar. Within this range, an ABS-based injection-molded article having desired mechanical characteristics may be manufactured.

An ABS-based injection-molded article manufactured according to the present invention may exhibit a high gloss (45°) of 95.5 or more, 96.5 or more, or 97 or more and a reflection haze (clearness) of 2.0 or less, 1.7 or less, or 1.5 or less.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES

Example 1

1. Preparation of Rubbery Polymer 65 parts by weight of deionized water, 70 parts by weight of 1,3-butadiene as monomers, 1.0 part by weight of potassium rosinate, and 1.2 parts by weight of dimer acid potassium salt (Cas No. 67701-19-3), 0.8 parts by weight of potassium carbonate as an electrolyte, 0.3 parts by weight of t-dodecyl mercaptan as a molecular weight regulator, 0.3 parts by weight of potassium persulfate as an initiator, and 0.1 parts by weight of a compound represented by Formula 1 below as a crosslinking agent were fed batchwise into a polymerization reactor (autoclave) filled with nitrogen, and reaction was allowed to proceed at a reaction temperature of 70° C.:

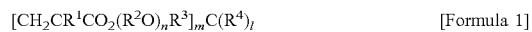
[Formula 1]

wherein R1 is H, R2 is C2H4, R3 is CH2, R4 is C2H5, l is 1, n is 5, and m is 3.

Subsequently, 20 parts by weight of 1,3-butadiene and 0.15 parts by weight of potassium rosinate were added thereto batchwise when a polymerization conversion rate was 30%, and then reacted at 75° C. In addition, 0.1 parts by weight of t-dodecyl mercaptan was added thereto batchwise when a polymerization conversion rate was 53%, and reacted until a polymerization conversion rate reached 60%. Subsequently, when a polymerization conversion rate was 61%, 0.35 parts by weight of dimer acid potassium salt was added and remaining 1,3-butadiene (10 parts by weight) was added thereto batchwise, followed by elevating reaction temperature up to 82° C. When a polymerization conversion rate was 93%, reaction was terminated. Here, a prepared polymer had an average particle diameter of 3,130 Å, a gel content of 75%, and a weight ratio of 98:2 between a large-diameter rubbery polymer and a small-diameter rubbery polymer (average particle diameter: 30 to 70 nm).

In the present invention, a resultant rubbery polymer was analyzed as follows:

Polymerization Conversion Rate (%)

To find a polymerization conversion rate, 1.5 g of a prepared latex was dried for 15 minutes in a 150° C. hot air dryer, and a weight of the dried latex was measured to find a total solid content (TSC). The polymerization conversion rate was calculated according to Mathematical Equation 1 below:

Polymerization conversion rate (%)=Total solid content (TSC)×(weight of added monomers and supplementary materials)/100−(weight of added supplementary materials except for monomers) [Mathematical Equation 1]

Average Particle Diameter of Latex (Å)

To find average particle diameter, 1 g of a latex was mixed with 100 g of distilled water. The average particle diameter was measured by means of a Nicomp 380HPL (manufactured by PSS·Nicomp, US) according to a dynamic laser light scattering method.

Gel Content (% by Weight)

A rubbery polymer was coagulated using a dilute acid or a metal salt and then washed, followed by drying in a 60° C. vacuum oven for 24 hours. An obtained rubber lump was thinly cut with scissors. 1 g of a rubber piece was immersed in 100 g of toluene and stored in a room-temperature dark room for 48 hours, followed by separating into a sol and gel. A separated gel portion was dried in an 85° C. oven for six hours. Subsequently, a gel content was measured according to Mathematical Equation 2 using the weight of the dried gel:

Gel content (% by weight)=(Weight of insoluble matter (gel)/weight of sample)×100 [Mathematical Equation 2]

Average Particle Diameters of Small-Diameter Rubbery Polymer and Large-Diameter Rubbery Polymer and Ratio Thereof In the present disclosure, average particle diameters of a small-diameter rubbery polymer and a large-diameter rubbery polymer and a ratio thereof were measured using a counted analysis value for each particle diameter by means of TEM analysis equipment (JEM-1400, manufactured by Jeol).

2. Preparation of ABS-Based Graft Copolymer 65 parts by weight of the rubbery polymer (based on solid content) was fed into a nitrogen-substituted reactor, and an monomer emulsion, which was prepared by mixing 10 parts by weight of acrylonitrile, 25 parts by weight of styrene, 0.1 parts by weight of t-butyl hydroperoxide, 1 part by weight of dimer acid potassium salt, and 0.3 parts by weight of t-dodecyl mercaptan in a separate mixer, was continuously added thereto over three hours at 70° C. At this time, 0.054 parts by weight of dextrose, 0.004 parts by weight of sodium pyrophosphate, and 0.002 parts by weight of ferrous sulfate were continuously added batchwise. After adding the monomer emulsion, 0.05 parts by weight of dextrose, 0.03 parts by weight of sodium pyrophosphate, 0.001 parts by weight of ferrous sulfate, and 0.005 parts by weight of t-butyl hydroperoxide were fed batchwise into the reactor, and then temperature was elevated up to 80° C. over one hour, followed by terminating the reaction. Here, an obtained graft copolymer latex had a polymerization conversion rate of 98.7% and a graft rate of 40%.

In the present invention, the graft copolymer latex was analyzed as follows.

Graft Rate (%)

A graft polymer latex was coagulated, washed, and dried, whereby a powder-type graft polymer latex was obtained. 2 g of this obtained powder was added to 300 ml of acetone, followed by stirring for 24 hours. A resultant solution was separated by means of an ultracentrifuge. A separated solution was added dropwise to methanol, thereby obtaining a non-grafted portion. The obtained non-grafted portion was dried at 60 to 120° C. and then the weight thereof was measured. Using the measured weights, a graft rate was calculated according to Mathematical Equation 3:

Graft rate (%)=(Weight of grafted monomer/weight of rubbery)×100 [Mathematical Equation 3]

3. Manufacture of ABS-Based Injection-Molded Article 0.5 parts by weight of IR1076, as an antioxidant, was added to the graft copolymer latex. Subsequently, this resultant mixture and 2.0 parts by weight of H2SO4 (10% aqueous solution) were added dropwise to a coagulation tank maintained at 85° C. to perform first coagulation. Subsequently, second aging was performed at 97° C., and then dehydration and drying were performed. As a result, a powder-type graft copolymer was obtained. To 26 parts by weight of the obtained graft copolymer, 74 parts by weight of a styrene-acrylonitrile copolymer (LG SAN 92HR) having a weight average molecular weight of 110,000 g/mol and an acrylonitrile content of 27% by weight, 1.0 part by weight of a lubricant, and 0.1 parts by weight of a heat stabilizer were added, and extrusion (extrusion temperature: 210° C., 160 rpm) and injection molding (injection-molding tempera-ture: 21.0° C., injection-molding pressure: 80 bar, Engel ES 200/45 HL-Pro Series) were performed. As a result, a specimen for measuring properties was obtained.

Example 2

An experiment was carried out in the same manner as in Example 1, except that, as an emulsifier in a process of preparing a graft copolymer, potassium rosinate was used instead of dimer acid potassium salt. Here, a prepared graft copolymer latex exhibited a polymerization conversion rate of 98.4% and a graft rate of 38%.

Example 3

An experiment was carried out in the same manner as in Example 1, except that, in processes of preparing a rubbery polymer and a graft copolymer, a mixture of a dimer acid potassium salt and potassium oleate mixed in a ratio of 50:50 based on % by weight was used instead of dimer acid potassium salt. Here, a prepared graft copolymer latex exhibited a polymerization conversion rate of 98.7% and a graft rate of 41%.

Example 4

An experiment was carried out in the same manner as in Example 1, except that, when a rubbery polymer was prepared, it was omitted to add a dimer acid potassium salt at a conversion rate of 61%. A generated rubbery polymer latex exhibited an average particle diameter of 3,204 Å and a gel content of 74%. In addition, a small-diameter rubbery polymer was not generated and a large-diameter rubbery polymer was only generated.

Example 5

An experiment was carried out in the same manner as in Example 1, except that, when a rubbery polymer was prepared, a mixture of dimer acid potassium salt and potassium stearate mixed in a ratio of 80:20 based on % by weight was used instead of a dimer acid potassium salt. A generated rubbery polymer latex exhibited an average particle diameter of 3,095 Å and a gel content of 76%. In addition, a weight ratio of a large-diameter rubbery polymer to a small-diameter rubbery polymer (average particle diameter: 30 to 70 nm) was 98:2.

Comparative Example 1

An experiment was carried out in the same manner as in Example 1, except that 1.5 parts by weight of potassium rosinate and 0.8 parts by weight of potassium oleate were used instead of a dimer acid potassium salt in a step of preparing a rubbery polymer, and 0.35 parts by weight of potassium oleate were used instead of dimer acid potassium salt in a step of preparing a graft copolymer. Here, a prepared rubbery polymer exhibited a conversion rate of 92.5%, an average particle diameter of 3,140 Å, and a gel content of 75%. In addition, a weight ratio of a large-diameter rubbery polymer to a small-diameter rubbery polymer (average particle diameter: 30 to 70 nm) was 98:2. Further, a prepared graft copolymer latex exhibited a polymerization conversion rate of 98.5% and a graft rate of 39%.

Comparative Example 2

An experiment was carried out in the same manner as in Example 3, except that, in processes of preparing a rubbery polymer and a graft copolymer, a mixture of dimer acid potassium salt and potassium oleate mixed in a ratio of 20:80 based on % by weight was used. Here, a prepared rubbery polymer exhibited a conversion rate of 93.5%, an average particle diameter of 3,070 Å, and a gel content of 75%. In addition, a weight ratio of a large-diameter rubbery polymer to a small-diameter rubbery polymer (average particle diameter: 30 to 70 nm) was 97:3. Further, a prepared graft copolymer latex exhibited a polymerization conversion rate of 98.7% and a graft rate of 40%.

Comparative Example 3

An experiment was carried out in the same manner as in Example 1, except that, when a rubbery polymer was prepared, 0.35 parts by weight of a dimer acid potassium salt were added when a conversion rate was 42%, and a dimer acid potassium salt was not added when a conversion rate was 61%. A generated rubbery polymer latex exhibited an average particle diameter of 2,795 Å and a gel content of 78%. In addition, a weight ratio of a large-diameter rubbery polymer to a small-diameter rubbery polymer (average particle diameter: 30 to 70 nm) was 96:4.

TEST EXAMPLES

Properties of the rubbery polymers and the graft copolymers prepared in the examples and the comparative examples are summarized in Table 1 below, and properties of ABS-based injection-molded articles respectively manufactured therefrom are summarized in Table 2 below.

Izod Impact Strength (Kgf·Cm/Cm)

A specimen was manufactured to a thickness of ¼", and Izod impact strength thereof was measured according to a standard measurement method, ASTM D256.

Low-Temperature Impact Strength (Kgf·Cm/Cm)

A specimen for measuring Izod impact strength was stored at −20° C. for 2 hours or more, and then impact strength thereof was measured in a low-temperature chamber equipped with an impact strength meter according to ASTM D256.

Gloss

Gloss of a specimen was measured at 45° according to a standard measurement method, ASTM D523.

Surface Clearness (Reflection Haze)

The reflection haze of a specimen was measured by adding a gloss value of 17 to 19° and a gloss value of 21 to 23° according to a standard measurement method, ASTM E430.

Amount of TVOC Generated from ABS-Based Resin (Ppm)

A total amount of volatile organic compounds (VOC) generated, at 250° C. for 1 hour, from 1 g of an extruded pellet prepared using the ABS-based graft copolymer was measured using HS-GC/MSD.

TABLE 1

| | Rubbery polymer | | | | | Graft copolymer | |
|---|---|---|---|---|---|---|---|
| | Conversion rate (%) | Particle diameter (Å) | Large-diameter:small-diameter (weight ratio) | Gel content (%) | Coagulum (%) | Conversion rate (%) | Graft rate (%) |
| Example 1 | 93 | 3,130 | 98:2 | 75 | 0.03 | 98.7 | 40 |
| Example 2 | 93 | 3,130 | 98:2 | 75 | 0.03 | 98.4 | 38 |
| Example 3 | 93.2 | 3,100 | 98:2 | 76 | 0.02 | 98.7 | 41 |
| Example 4 | 92.1 | 3,204 | 100:0 | 74 | 0.03 | 98.2 | 37 |
| Example 5 | 92.9 | 3,095 | 98:2 | 76 | 0.02 | 98.4 | 40 |
| Comparative Example 1 | 92.5 | 3,140 | 98:2 | 75 | 0.03 | 98.5 | 39 |
| Comparative Example 2 | 93.5 | 3,070 | 97:3 | 75 | 0.04 | 98.7 | 40 |
| Comparative Example 3 | 94.1 | 2,795 | 96:4 | 78 | 0.05 | 98.5 | 44 |

TABLE 2

| | ABS-based injection-molded article | | | | |
|---|---|---|---|---|---|
| | Impact strength (kg·cm/cm) | Low-temperature impact strength (kg·cm/cm) | Gloss | clearness | Generated TVOC amount (ppm) |
| Example 1 | 36.2 | 13.4 | 98.0 | 1.3 | 1,900 |
| Example 2 | 35.9 | 13.1 | 95.8 | 1.6 | 2,500 |
| Example 3 | 35.4 | 13.2 | 97.1 | 1.5 | 2,800 |
| Example 4 | 35.7 | 12.1 | 94.8 | 1.8 | 2,100 |
| Example 5 | 35.4 | 12.9 | 96.9 | 1.5 | 2,000 |
| Comparative Example 1 | 36.1 | 13.1 | 93.5 | 2.5 | 5,100 |
| Comparative Example 2 | 35.5 | 12.9 | 95.1 | 2.1 | 4,500 |
| Comparative Example 3 | 31.2 | 11.9 | 98.1 | 1.5 | 2,700 |

As shown in Table 2, it can be confirmed that, in the cases of Examples 1 to 5 according to the method of the present invention, a gas (TVOC) generation amount is small during injection molding and thus gloss and clearness are superior, compared to Comparative Examples 1 and 2.

In particular, it can be confirmed that, in the case of Example 1 in which an emulsifier including a dimer acid potassium salt was used in both the process of preparing a diene-based rubber latex and the process of preparing an ABS-based graft copolymer, a gas (TVOC) generation amount during injection molding is considerably low and gloss and clearness are most excellent.

However, it can be confirmed that, in the case of Comparative Example 1 in which the novel emulsifier was not used at all, a gas (TVOC) generation amount is considerably large during injection molding and thus gloss and clearness are poor, compared to Examples 1 to 5.

In addition, it can be confirmed that, in the case of Comparative Example 2 in which the emulsifier prepared by mixing dimer acid potassium salt and potassium oleate in a weight ratio of 20:80 was used when the diene-based rubber latex was prepared, a gas (TVOC) generation amount is high and gloss and clearness are low despite inclusion of the dimer acid potassium salt.

In addition, referring to results of Examples 1 and 4 and Comparative Example 3 shown in Table 1, it can be confirmed that a ratio of the large-diameter polymer to the small-diameter polymer in the rubber latex depends upon an addition time point of the emulsifier upon preparation of the rubber latex.

Further, it can be confirmed that a ratio of the large-diameter polymer to the small-diameter polymer in the latex affects impact strength and low-temperature impact strength of the final ABS-based injection-molded article and, in the cases of Examples 1 to 3 and Example 5 in which the large-diameter polymer and the small-diameter polymer are included in an appropriate ratio, all of appearance characteristics, such as gloss, and mechanical properties, such as impact strength, are superior.

In addition, referring to results of Example 1 and Comparative Example 3 shown in Tables 1 and 2, it can be confirmed that a ratio of the large-diameter polymer to the small-diameter polymer depends upon an additional addition time point of the dimer acid potassium salt upon preparation of the rubbery polymer and, in the case of Comparative Example 3 in which a ratio of the small-diameter polymer is high, impact strength and low-temperature impact strength are very poor.

The invention claimed is:

1. A method of preparing a diene-based rubber latex, the method comprising a polymerization step of polymerizing a conjugated diene based monomer, a crosslinking agent, at least one emulsifier, and a molecular weight regulator,
   wherein the crosslinking agent is represented by Formula 1 below and added in an amount of 0.05 to 0.5 parts by weight before initiation of the polymerization or when a polymerization conversion rate is 30% or less:

[CH$_2$=CR$^1$CO$_2$(R$^2$O)$_n$R$^3$]$_m$C(R$^4$)$_l$     (Formula 1)

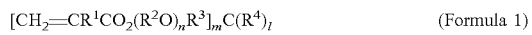

wherein R$^1$ is hydrogen or a C1 to C10 alkyl group, R$^2$ is a C1 to C10 alkylene group, R$^3$ is a C1 to C10 alkylene group, R$^4$ is a C1 to C10 alkyl group, l is an integer of 0 to 2, n is an integer of 4 to 20, m is an integer of 2 to 4, and m+l=4,
   the at least one emulsifier comprises a first emulsifier that comprises a multimeric acid of an unsaturated fatty acid or a metal salt thereof that is added when a polymerization conversion rate is 30% or less or 50 to 85%,
   wherein the polymerization comprises an additional emulsifier addition step of adding 5 to 20 parts by weight of the conjugated diene based monomer and 0.01 to 0.5 parts by weight of a second emulsifier that comprises a multimeric acid of an unsaturated fatty acid having a CMC of greater than 150 mg/L or a metal salt thereof when the polymerization conversion rate is 50 to 85%.

2. The method according to claim 1, wherein the first emulsifier comprises 30 to 100% by weight of the multimeric acid of the unsaturated fatty acid or the metal salt thereof based on 100% by weight of the first emulsifier.

3. The method according to claim 1, wherein the unsaturated fatty acid in the first emulsifier or the unsaturated fatty acid in the second emulsifier is a straight-chain, branched-chain, or cyclic unsaturated fatty acid having 8 to 22 carbon atoms.

4. The method according to claim 1, wherein the multimeric acid of the first emulsifier or the multimeric acid in the second emulsifier is a dimer acid.

5. The method according to claim 1, wherein the step of the polymerization comprises a polymerization initiation step of initiating polymerization of 60 to 75 parts by weight of the conjugated diene based monomer, 0.05 to 3 parts by weight of the at least one emulsifier, and 0.01 to 1 part by weight of an initiator at 60 to 75° C.

6. The method according to claim 5, wherein the at least one emulsifier in the polymerization initiation step comprises a secondary emulsifier that is one or more selected from the group consisting of a sodium lauryl sulfate, a sulfonated alkyl ester, a sodium alkylbenzene sulfonate, sodium dodecyl allyl sulfosuccinate, sodium acrylamido stearate, a polyoxyethylene alkyl ether sulfate ester ammonium salt, a C16 to C18 alkenyl succinic acid di-potassium salt, a polyoxyethylene alkyl phenyl ether, a polyoxyethylene alkyl phenyl ether ammonium sulfate, a rosin acid metal salt, a fatty acid metal salt, and an oleic acid metal salt.

7. The method according to claim 1, wherein the polymerization comprises a secondary emulsifier addition step of adding 10 to 25 parts by weight of the conjugated diene based monomer and 0.1 to 1.0 part by weight of a secondary emulsifier when the polymerization conversion rate is 30 to 40%.

8. The method according to claim 1, wherein the at least one emulsifier comprises a secondary emulsifier having a CMC of 10 mg/L or less or a secondary emulsifier having a CMC of greater than 10 to 150 mg/L or less.

9. The method according to claim 8, wherein the secondary emulsifier having a CMC of 10 mg/L or less is one or more selected from the group consisting of a C16 to C18 alkenyl succinic acid di-potassium salt, a polyoxyethylene alkyl phenyl ether, and a polyoxyethylene alkylphenyl ether ammonium sulfate,
   wherein the secondary emulsifier having a CMC of greater than 10 to 150 mg/L or less is a fatty acid metal salt or an oleic acid metal salt.

10. The method according to claim 1, wherein the molecular weight regulator is added in an amount of 0.01 to 0.25 parts by weight when the polymerization conversion rate is 40 to 75%.

11. The method according to claim 1, wherein the diene-based rubber latex is an in-situ bimodal rubber latex comprising a large-diameter rubber polymer having an average particle diameter of 2,600 to 5,000 Å and a small-diameter rubber polymer having an average particle diameter of 200 to 800 Å.

12. The method according to claim 11, wherein a weight ratio of the large-diameter rubber polymer to the small-diameter rubber polymer is 98:2 to 99.9:0.1.

13. A method of preparing an ABS-based graft copolymer, the method comprising a step of adding 0.05 to 3 parts by weight of a third emulsifier and 0.01 to 1 part by weight of an initiator to 100 parts by weight of a monomer mixture comprising 40 to 70% by weight (based on solids) of the diene-based rubber latex according to claim 1, 20 to 50% by weight of an aromatic vinyl monomer, and 10 to 40% by weight of a vinyl cyan monomer and performing graft polymerization.

14. The method according to claim 13, wherein the third emulsifier comprises a multimeric acid of an unsaturated fatty acid or a metal salt thereof.

15. The method according to claim 14, wherein the multimeric acid of the unsaturated fatty acid or the metal salt thereof is comprised in an amount of 30 to 100% by weight based on 100% by weight of the third emulsifier.

16. A method of manufacturing an ABS-based injection-molded article, the method comprising an injection-molding step of injection-molding a resin composition comprising 5 to 70% by weight of the ABS-based graft copolymer prepared according to the method of claim 13 and 30 to 95% by weight of an aromatic vinyl monomer-vinyl cyan monomer copolymer.

17. The method according to claim 16, wherein, during the injection-molding step, a gas generation amount (TVOC) is 4,000 ppm or less.

18. The method according to claim 16, wherein the ABS-based injection-molded article has a gloss (45°) of 95.5 or more and a reflection haze of 2.0 or less.

\* \* \* \* \*